(12) United States Patent
Opper

(10) Patent No.: US 7,100,354 B2
(45) Date of Patent: Sep. 5, 2006

(54) SHUT-OFF SYSTEM FOR THE AVOIDANCE OF AN OVERSPEED CONDITION IN THE EVENT OF A SHAFT FAILURE

(75) Inventor: Hans-Otto Opper, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 94 days.

(21) Appl. No.: 10/791,288

(22) Filed: Mar. 3, 2004

(65) Prior Publication Data

US 2005/0193715 A1    Sep. 8, 2005

(30) Foreign Application Priority Data

Mar. 7, 2003    (DE) ............................... 103 09 910

(51) Int. Cl.
    *F02C 9/00*    (2006.01)
(52) U.S. Cl. .................. 60/39.091; 60/223; 73/488
(58) Field of Classification Search ............ 60/39.091, 60/223; 73/508, 509, 488
    See application file for complete search history.

(56) References Cited

U.S. PATENT DOCUMENTS

| 2,359,899 | A | * | 10/1944 | Conant ................... 200/80 R |
| 3,032,985 | A | * | 5/1962 | Alexander et al. ........ 60/39.281 |
| 4,473,998 | A | * | 10/1984 | King ....................... 60/39.091 |
| 4,712,372 | A | | 12/1987 | Dickey et al. ........... 60/39.091 |

FOREIGN PATENT DOCUMENTS

| DE | 19727296 | 1/1999 |
| GB | 872654 | 7/1961 |
| GB | 2377731 | 1/2003 |

* cited by examiner

*Primary Examiner*—Ted Kim
(74) *Attorney, Agent, or Firm*—Timothy J. Klima

(57) ABSTRACT

A mechanical-electronic shut-off system detects a shaft failure and initiates the shut-off of the fuel supply. It features, on the free end of a reference shaft (2) connected the to energy-consuming end of the respective shaft (1), an axially moveable signal trip element (13, 14) held under pre-load (12) whose locking arrangement (17,18) is released via a radial driver arrangement (17, 19) by rotary movement in the event of a shaft failure. The resultant relative rotation of the shaft (1) enables the signal trip element to move towards a sensor (21) or a switching element. An electric signal so produced instantly interrupts the further supply of fuel by means of an electronic control and avoids or controls a dangerous overspeed condition of the failed shaft.

20 Claims, 6 Drawing Sheets

SHUT-OFF SYSTEM FOR THE AVOIDANCE OF AN OVERSPEED CONDITION IN THE EVENT OF A SHAFT FAILURE

This application claims priority to German Patent Application DE10309910.7 filed Mar. 7, 2003, the entirety of which is incorporated by reference herein.

BACKGROUND OF THE INVENTION

This invention relates to a shut-off system for the avoidance of an overspeed condition in the event of a shaft failure, in particular for the interruption of the fuel supply of an aircraft engine in the event of a failure of the low-pressure turbine shaft, with the energy-consuming end of the respective shaft being connected to a coaxial reference shaft.

In particular on aircraft engines, but also on turbomachines in general, a shaft failure, especially a failure of the low-pressure turbine shaft, constitutes a considerable hazard to persons and property. In the event of a failure of a turbine shaft, the energy-generating end of the shaft, i.e. the part of the shaft which is connected to the turbine rotor, will run up in an uncontrolled manner since it is now disconnected from the energy-consuming end of the shaft. Consequently, the engine and/or the aircraft may be damaged or destroyed.

Various devices for the mechanical and/or electronic detection of a shaft failure and for the subsequent interruption of the energy supply (fuel supply) to avoid an overspeed condition and its negative consequences are known. Here, it is crucial that a shaft failure is detected as early as possible and the engine is shut off instantly by interruption of the fuel supply.

In an electronic device for the detection or avoidance of an overspeed condition known from Patent Specification U.S. Pat. No. 4,712,372, two inductive sensors are arranged on the toothed turbine shaft, i.e. on the energy-consuming end and on the energy-generating end, which produce a speed-proportional signal corresponding to the number of pulses counted. If a speed difference resulting from an increase of the speed of that part of the shaft which is connected to the turbine rotor, and thus a shaft failure, is detected, a solenoid fuel valve will be actuated and the fuel supply interrupted, avoiding further acceleration of the turbine rotor. However, the electronic shut-off systems are critical in that their response times are relatively long. For safety reasons, relatively long shut-off times require a higher material input in the area of the turbine which, in turn, leads to an increase in weight.

Furthermore, mechanical devices are described in which a reference shaft is coaxially associated to the turbine shaft and connected to the forward, energy-consuming end of the turbine shaft. In the event of a shaft failure, the resultant rotation of the turbine shaft relative to the reference shaft is used to mechanically actuate the fuel shut-off valve. In a known mechanical device of this type for the control of overspeed conditions in the event of a failure of the low-pressure turbine shaft connecting the low-pressure turbine and the fan of an aircraft engine, recesses are provided on the rear ends of both shafts. In the event of a shaft failure, the low-pressure turbine shaft will rotate relative to the reference shaft and the—initially offset—recesses in both shafts will come into coincidence, as a result of which a pre-loaded driver provided on the low-pressure turbine shaft will swing out radially and engage a wire loop provided at the end of a wire rope. The pull exerted on the wire rope is transmitted to a fuel shut-off valve to close it, thus limiting the overspeed condition by interrupting the fuel supply. The known mechanical devices using a reference shaft are disadvantageous in that their response depends on a comparatively large angle of relative rotation between the turbine shaft and the reference shaft. Also, the purely mechanical design of the shut-off system, and, in particular, the wire rope connection between the turbine shaft and the fuel shut-off valve, incurs high design effort and is susceptible to wear.

BRIEF SUMMARY OF THE INVENTION

In a broad aspect, the present invention provides for a development of the known mechanical shut-off systems using a reference shaft to enable a shaft failure to be detected instantly and a resultant overspeed condition to be avoided or controlled rapidly.

It is a particular object of the present invention to provide solution to the above problems by a shut-off system designed in accordance with the features described herein. Further objects and advantages of the present invention become apparent from the description below.

The idea underlying the present invention is that, on the basis of a minor rotation of the main shaft relative to the reference shaft, a pre-loaded, axially movable signal trip element is released and moved with high acceleration and by a short route towards a sensor or electric switch mounted on the turbine casing, so that the distance change to an inductive, capacitive or similar sensor or the interruption of a light beam or a switch actuated by the signal trip element provides an electric signal by which the energy supply to the energy-generating end (driving end) of the respective shaft is interrupted via an electronic circuit. The signal trip element, which is held by means of an arrangement of radially protruding driver pins and latches, is released by drivers which are arranged immediately adjacent to the driver pins and extend from the main shaft.

In accordance with a further feature of the present invention, the signal trip element is a piston including a piston rod and a piston plate which is axially movable within a housing of the reference shaft and interacts with at least one pressure spring. The housing is located in a locating sleeve which extends from the main shaft and from which the drivers engaging the driver pins of the piston plate protrude radially inwards.

This form of a mechanical-electronic shut-off system combines simplicity of design and functional reliability. However, its major advantage lies in the fact that it enables a shaft failure to be detected instantly, if necessary as early as in the fracture initiation phase, and an electric signal for the electronically controlled interruption of the further energy supply to be generated immediately, thus avoiding, or at least limiting, a dangerous overspeed condition. In contrast to the known safety systems, significantly reduced signal trigger times and thus fuel supply shut-off times are obtainable which range, in the present case, between 1 and 3 milliseconds, this enabling the risk and extent of damage to be reduced, the safety-relevant dimensions of the engine rotors to be decreased and, thus, weight to be saved.

The functional reliability of the overall system results from the fact that all components for the release and movement of the signal trip element and for the production of the electric signal for the electronic control are, or can be, provided redundantly.

BRIEF DESCRIPTION OF THE DRAWINGS

The present invention is more fully described in the light of the accompanying drawings showing embodiments and favorable developments and advantageous objects thereof. In the drawings.

DETAILED DESCRIPTION OF THE INVENTION

Figure 1:
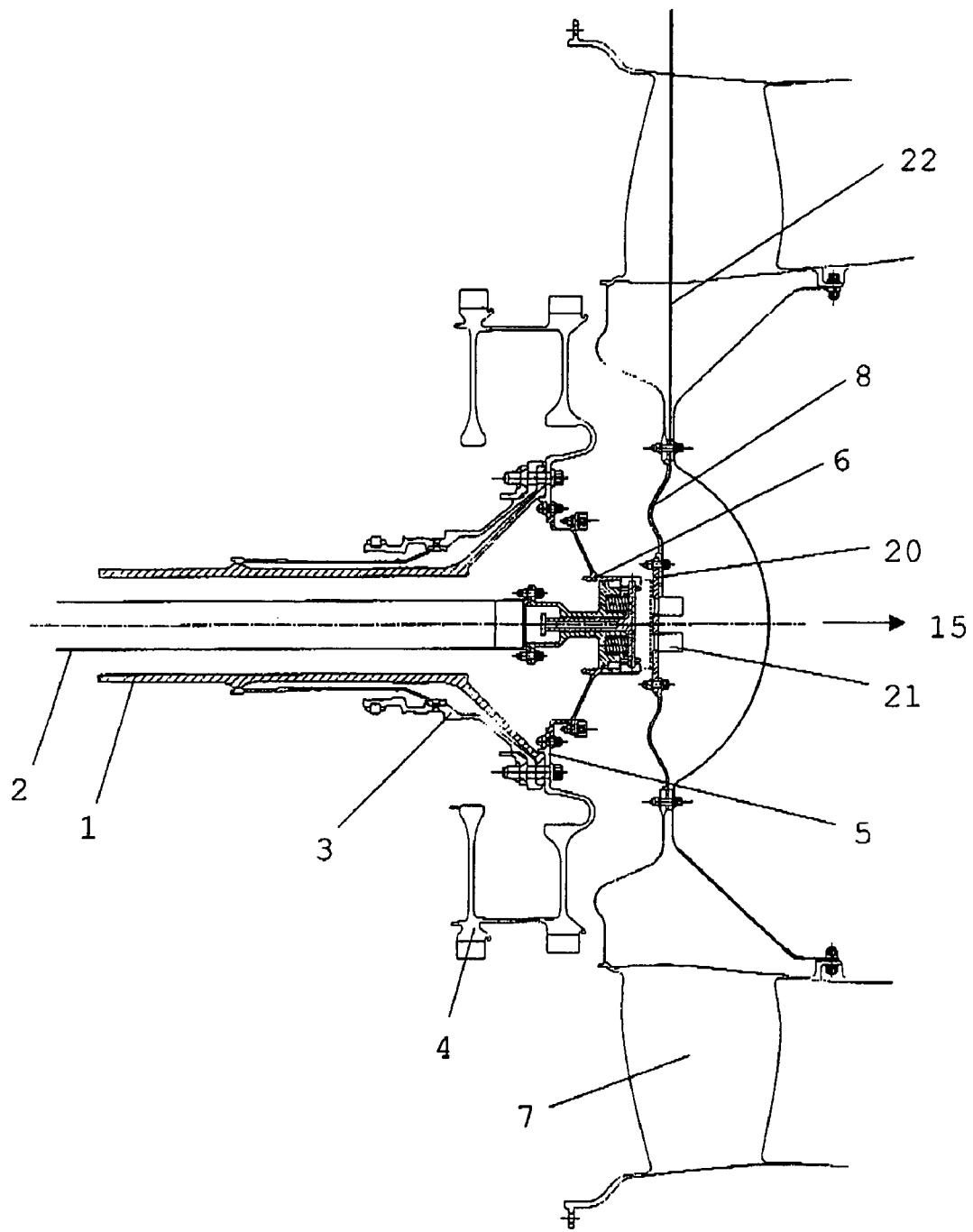
FIG. 1 is a partial view of a gas turbine engine in the area of the low-pressure turbine rotor, with a mechanical-inductive shut-off system for the fuel supply in the event of a shaft failure associated with the low-pressure turbine shaft.
Figure 5:
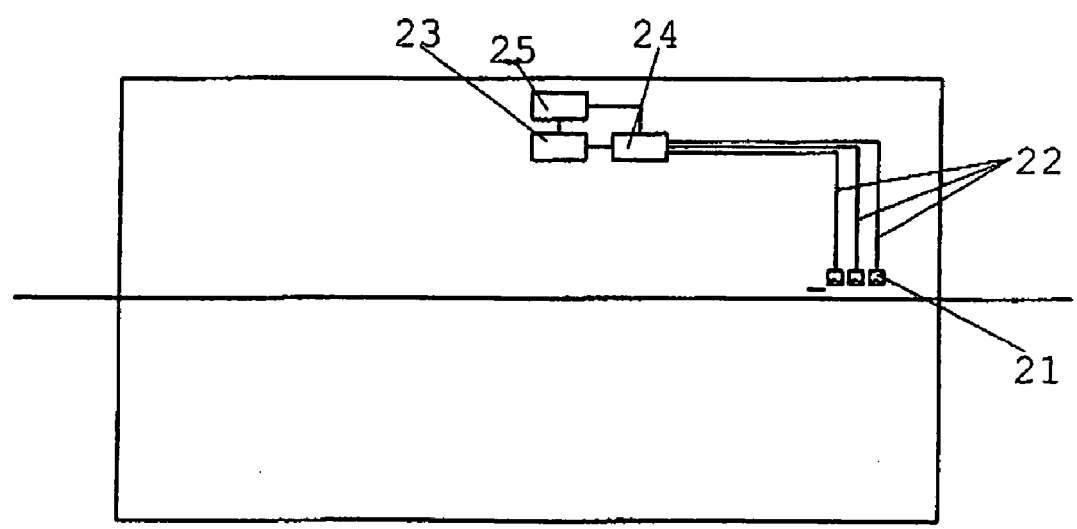
FIG. 5 is a circuit arrangement associated with the mechanical-inductive shut-off device for the electronically controlled interruption of the fuel supply.

FIG. 1 shows a partial view of a gas turbine engine in the area of the low-pressure turbine rotor 4. As FIG. 1 shows, a reference shaft 2 is arranged coaxially with the low-pressure turbine shaft 1 and is positively connected to the forward end (energy-consuming end) of the low-pressure turbine shaft 1 (not shown). At the rear end of is the low-pressure turbine shaft 1, a bearing support 3 and the low-pressure turbine rotor 4 are arranged. A locating sleeve 6 provided on a mounting flange 5 of the low-pressure turbine rotor 4 houses the mechanical part of the shut-off system, this mechanical part being firmly connected to the reference shaft 2. Axially opposite of the locating sleeve 6, a mounting plate 8 with a threaded-on sensor pad 20 is installed on the turbine exit casing 7 on which inductive sensors 21 are arranged which inductively detect a shaft failure registered by the mechanical part of the shut-off system and from which connecting lines 22 lead to an electronic control 24 which is electrically connected to a power supply 25 and the fuel shut-off valve 23 (cf. FIG. 5).

Figure 2:
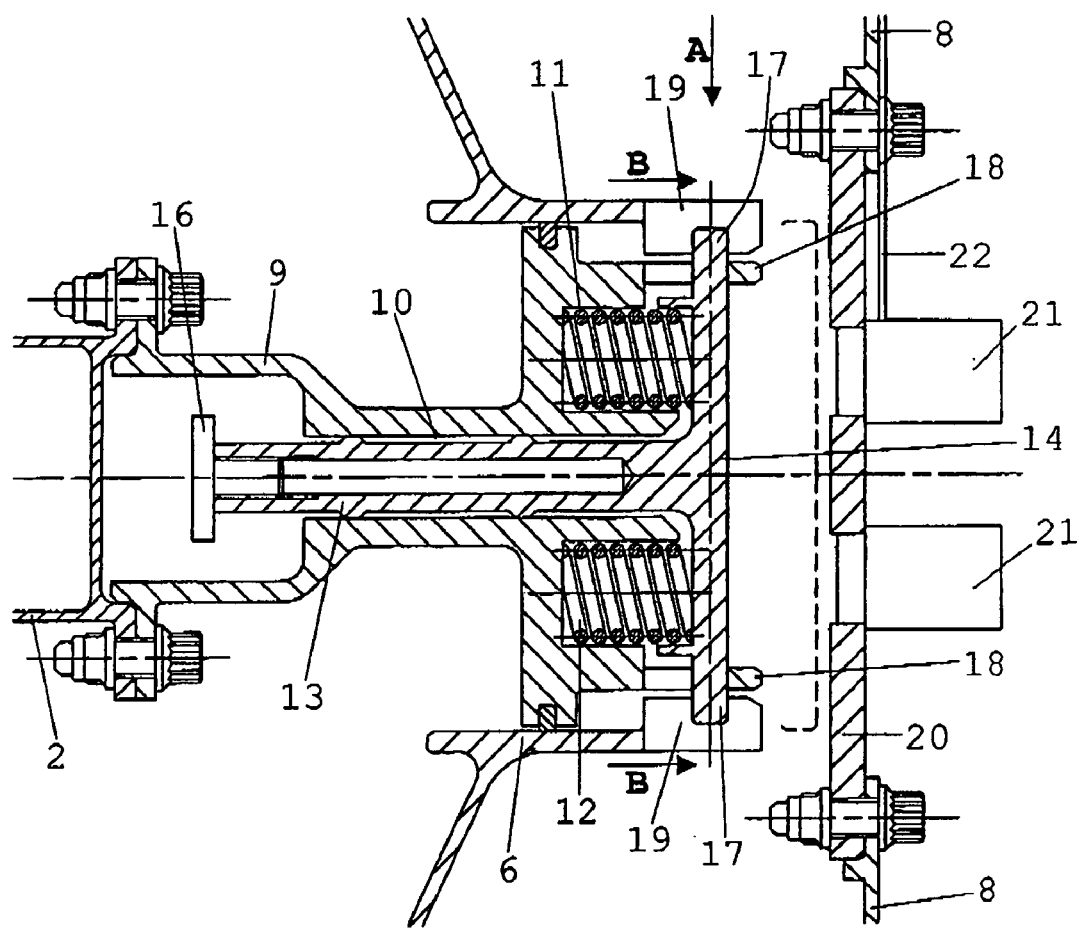
FIG. 2 is a detailed representation of the mechanical-inductive shut-off device as per FIG. 1.
Figure 3:
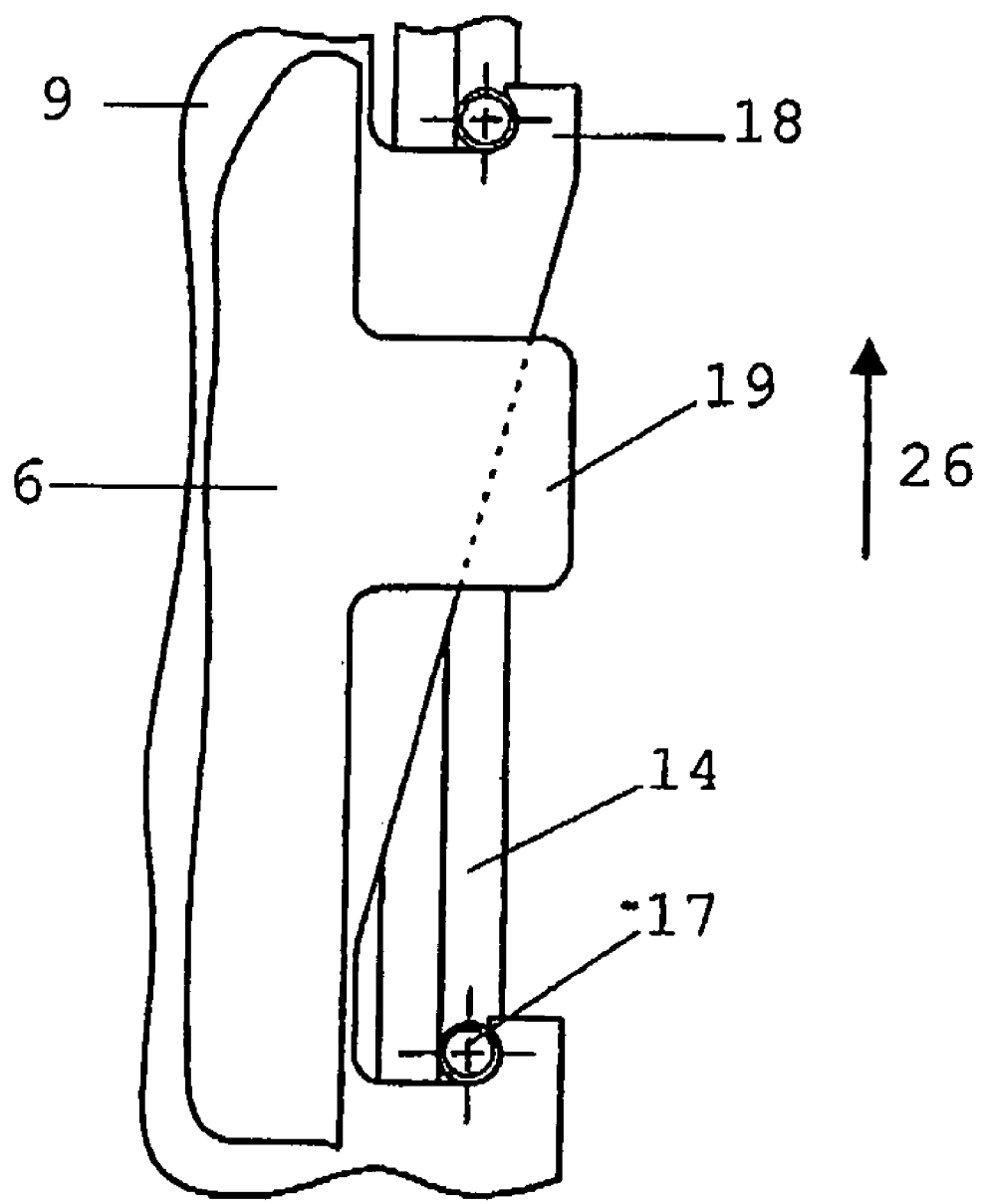
FIG. 3 is a developed partial view of the mechanical part of the shut-off device in the direction of arrowhead A in FIG. 2.
Figure 4:
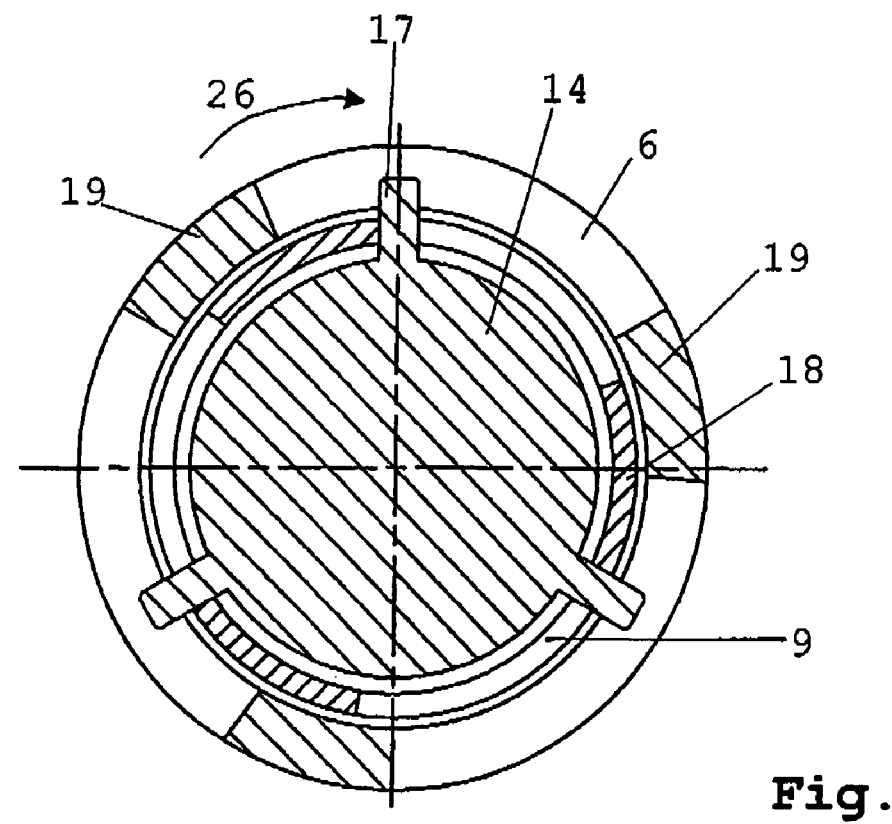
FIG. 4 is a section along line BB in FIG. 2.

The mechanical part of the shut-off system, as becomes apparent from FIG. 2, in particular, comprises a housing 9 which is attached to the reference shaft 2 on one side and located in the locating sleeve 6 connected to the low-pressure turbine shaft 1 on the other side, the housing 9 featuring a piston guide 10 and locating bushes 11 which each accommodate a mechanically pre-loaded pressure spring 12 as the force-exerting item in the event of a shaft failure. In the piston guide 10, a piston rod 13 is axially and rotatably moveable which carries, at the end face which is downstream in the direction of flow 15, a piston plate 14 (signal trip element) which is loaded by the pressure springs 12 and, at the end face which is upstream in the direction of flow 15, a stop bolt 16 which limits the axial movement of the piston plate 14 in the direction of flow. The piston rod 13 and the piston plate 14 can be made of metal, plastic or a composite material, for example carbon fiber, or of a combination of light materials and metal. As becomes apparent from the developed view A in FIG. 3, in particular, two, or another number of radial, cylindrical driver pins 17 are formed onto the circumference of the piston plate 14 which, together with the corresponding latches 18 provided on the housing 9, retain the piston plate 14 in the spring-energized initial position. Rotary drivers 19 are formed onto the locating sleeve 6 which are spaced from the cylindrical driver pins 17 at a certain rotary angle. As already mentioned, inductive sensors 21 are arranged opposite of the piston plate 14 and connected to the fuel shut-off valve 23 via the electronic control and the power supply 25 for the inductive detection of a shaft failure and the subsequent interruption of the fuel supply.

The above-described device for the mechanical-inductive detection of a shaft failure and the electronic shut-off of the energy supply to the low-pressure turbine shaft functions as follows.

In the event of a failure of the low-pressure turbine shaft 1, in which no torque is transmitted to the low-pressure compressor (energy-consuming side), but the low-pressure turbine rotor 4 is still subject to the energy of the core engine flow, a relative rotary movement (relative rotation) between the part of the low-pressure turbine shaft 1 (energy-generating end) which is connected to the low-pressure turbine rotor 4 and the reference shaft 2 will occur. At a certain rotary angle shift of the low-pressure turbine shaft 1 relative to the reference shaft 2, the drivers 19 formed onto the locating sleeve 6 will, due to the rotation of the locating sleeve 6 in the direction of arrowhead 26, engage the cylindrical driver pins 17 on the piston plate 14. The piston plate 14 is now co-rotated by the drivers 19 in the direction of arrowhead 26 and disengaged from the latches 18 retaining the piston plate 14 in its axial position. The piston plate 14, which is now freely moveable in the axial direction, is accelerated in the direction of the inductive sensors 21 by the action of the pressure springs 12. The change in distance between the piston plate 14 and the inductive sensors 21 generates electric signals in the sensors 21 which are transmitted to the electronic control 24 to interrupt the fuel supply via the fuel shut-off valve 23.

In contrast to the known electronic and mechanical systems for the shut-off of the fuel supply in the event of a shaft failure, significantly shorter signal trip times and shut-off times, which here lie in the range of 1 to 3 ms, can be achieved since the rotary angle required for the release of the piston plate 14 is reached rapidly and the travel of the quickly accelerated piston plate 14 for the tripping of the electric signals is very short. Consequently, the disks of the low-pressure turbine rotor 4 can be designed significantly smaller so that appreciable weight savings are achieved. Since the initiation of the shut-off process is independent of the angular position of the low-pressure turbine shaft 1 relative to the engine and, therefore, the supply of fuel is inhibited at the earliest possible time, the further fuel supply can, in the most favorable case, be interrupted already upon fracture initiation at the low-pressure turbine shaft 1, thus minimizing engine damage. Furthermore, the shut-off system is of simple, space-saving and lightweight design and works nearly wear-free. The proposed shut-off system also lends itself for the retrofitting of gas turbines.

The mechanical part and the electric signal-producing part of the shut-off system are, however, not limited to the present embodiment. For example, the cylindrical driver pins 17, the latches 18 and the drivers 19, as well as the pressure springs 12 and the sensors 21, can be provided redundantly. Similarly, the pressure spring 12 can be arranged centrally in the housing 9. In lieu of the pressure springs 12, other media acting upon the piston plate 14, for example gas pressure, can be applied.

Further forms of signal production for the electronic control 24 are possible. For example, capacitive, optical or ultrasonic sensors can also be used or the electric signal for the electronic control 24 for shutting the fuel shut-off valve 23 can be provided by a switch which, actuated by the piston plate 14, closes (or opens) an electric circuit.

Figure 6:
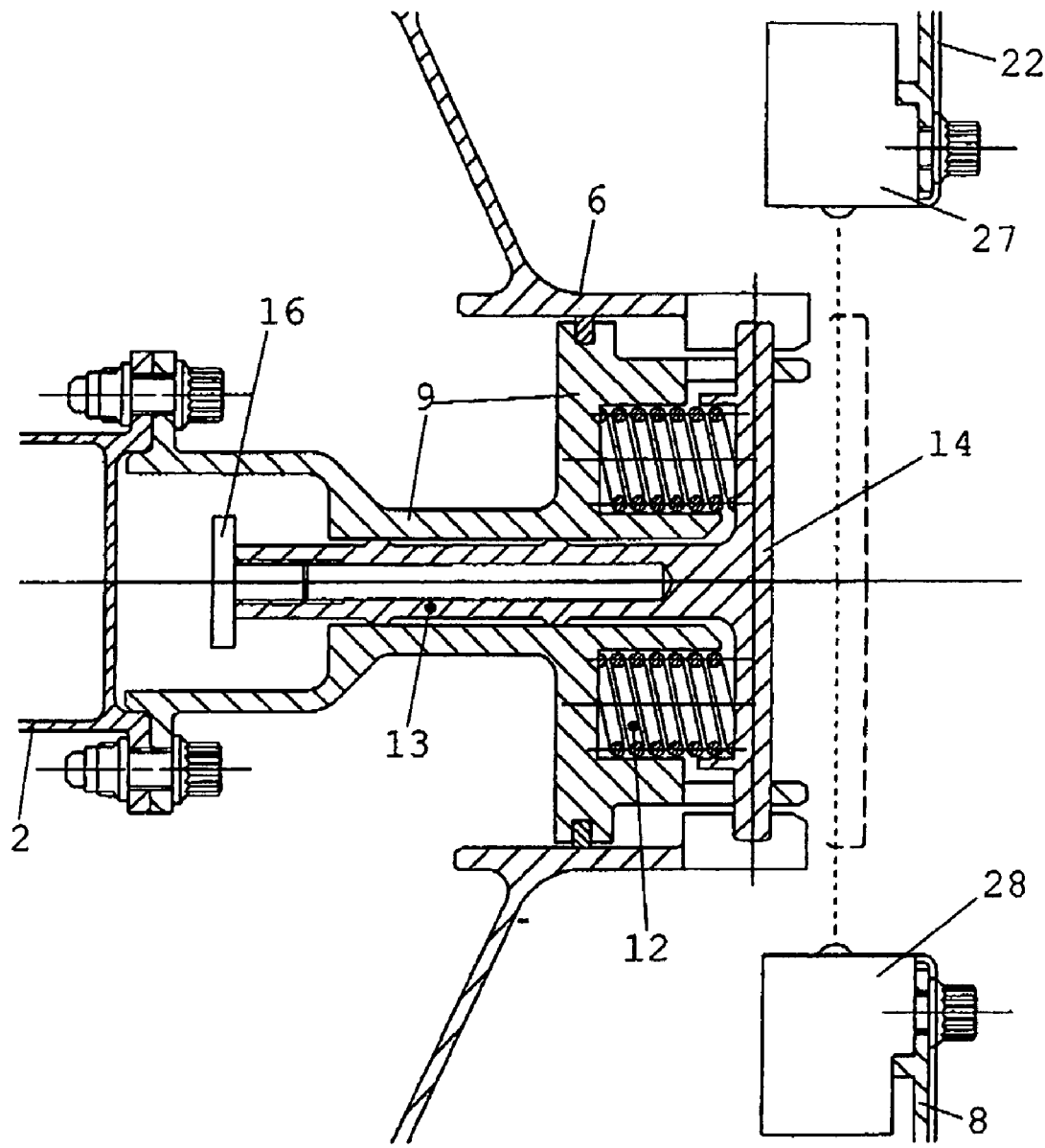
FIG. 6 is a sectional view of another embodiment of the shut-off device, here with mechanical-optical trigger of the electronically controlled shut-off process upon failure of the low-pressure turbine shaft.

FIG. 6 shows a further embodiment in which the inductive sensors are replaced by an optical transmitter 27 and an optical receiver 28 arranged such on the mounting plate 8 that the electric signal required for the electronic control 24 is produced when, upon shaft failure, the piston plate 14 is released and moved rearwards interrupting the optical path between the optical transmitter 27 and the optical receiver 28. Here as well, several pairs of optical transmitters and receivers can be provided for redundancy.

Figure 7:
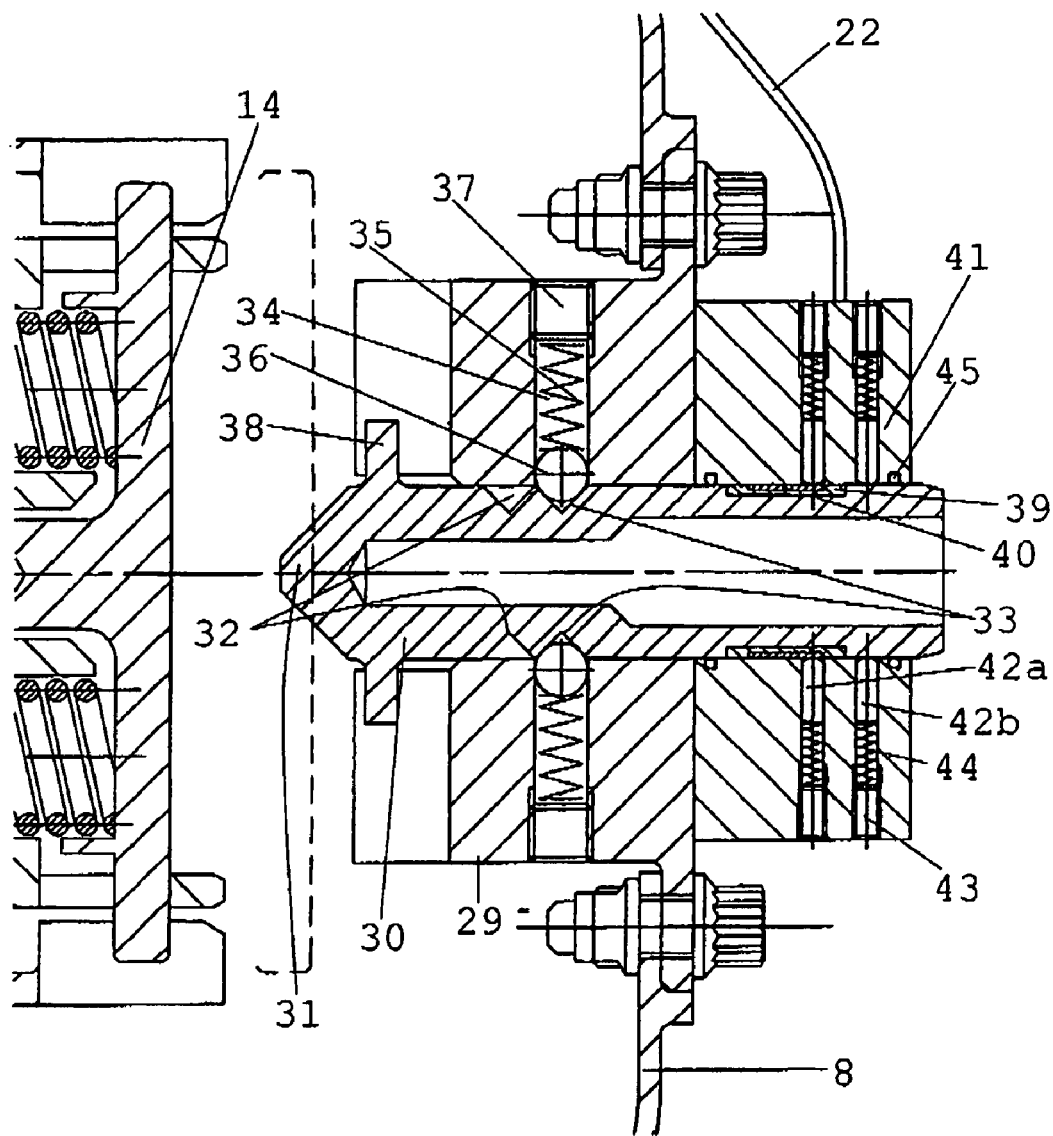
FIG. 7 is a sectional view of a further embodiment of the shut-off device, here with mechanical-electrical trigger of the electronically controlled shut-off process.

In a further embodiment shown in FIG. 7, the electric signal for the electronic control 24 is produced by means of an electric switching device, with the mechanical shut-off mechanism remaining unchanged. In this case, a switch housing 29 is integrated in the mounting plate 8 in which a switching cylinder 30 is axially moveable. The switching cylinder 30, which features a flat tip 31 facing the piston plate 14 and locating pins 38 as anti-rotation elements, is provided on its circumference with a forward and a rearward locating groove 32 and 33. A radial hole 34 is provided in the switch housing 29 in which a locking element consisting of a locating ball 36 loaded by a spring 35 is arranged. The spring 35 is retained by a screw 37. In the rearward area of the switching cylinder 30, a metallic or other type of conductive material conductor 40 is provided on an insulator 39 whose surface is flush with the surface of the switching cylinder 30. A switch 41 of electrically non-conductive material associated with the switch housing 29 features two contact pins 42 which act upon the periphery of the switching cylinder 30 under the force of a spring 44 retained by a screw 43. The enclosure of the switch 41 is sealed to the switching cylinder 30 by means of sealing rings 45. In the initial position of the switching cylinder 30 illustrated in FIG. 7 (with the low-pressure turbine shaft 1 intact), the locating ball 36 is forced into the rear locating groove 33 under spring force and the forward contact pins 42a touch the electrical conductor 40. If the low-pressure turbine shaft 1 fails, the piston plate 14 will be accelerated rearwards in the manner described above, hitting the flat tip 31 of the switching cylinder 30 and forcing the switching cylinder 30 rearwards until the locating balls 36 engage the forward locating groove 32. Both the forward contact pins and the rearward contact pins, 42a and 42b, now rest on the electrical conductor 40. The electric signal produced by the electrical connection so created is fed via the connecting line 22 to the electronic control 24 for the actuation of the fuel shut-off valve 23. According to the embodiment shown in FIG. 7, two pairs of contact pins 42a, 42b, each with two insulators 39, two electrical conductors 40, two locating balls 36 and two locating pins 38 are provided. For reasons of functional reliability, these items can also be arranged redundantly, or several switches using other operating principles, if applicable, can be provided on the periphery of the switching cylinder 30.

What is claimed is:

1. A shut-off system for the avoidance of an overspeed condition in the event of a respective shaft failure, comprising:
   a coaxial reference shaft connectable to an energy-consuming end of the respective shaft;
   a signal trip element attached to the reference shaft and being axially and rotatably located on an energy-generating end of the respective shaft;
   at least one loading item exerting an axial force on the signal trip element;
   at least one driver pin protruding radially from a periphery of the signal trip element;
   at least one latch engageable with the at least one driver pin to hold the signal trip element in a releasable locking position; and
   at least one laterally facing rotary driver attached to the energy-generating end of the respective shaft which, upon a failure of the respective shaft and a corresponding relative rotation of the reference shaft to the respective shaft, rotatably engages the at least one driver pin to disengage the at least one driver pin from the at least one latch and release the signal trip element from the locking position to enable the signal trip element to move axially towards at least one of a sensor or an electric switching element arranged axially opposite of the signal trip element to generate a signal to an electronic control to interrupt an energy supply to the respective shaft.

2. A shut-off system in accordance with claim 1, wherein the signal trip element comprises:
   a piston rod;
   a piston plate attached to the piston rod, with the at least one driver pin attached to a periphery of the piston plate;
   a stop attached to the piston rod for limiting its axial travel;
   a housing axially attached to the reference shaft and engageable with the piston rod to guide the piston rod,
   a locating sleeve in which the housing is located, the locating sleeve including the least one rotary driver on its inner circumference, and
   at least one locating bush for positioning the at least one loading item.

3. A shut-off system in accordance with claim 2, wherein the at least one loading item is at least one of a pressure spring and a gas pressure element.

4. A shut-off system in accordance with claim 2, wherein the stop is a stop bolt.

5. A shut-off device in accordance with claim 2, wherein the sensor comprises an optical sensor in the form of an optical transmitter and receiver; the transmitter and receiver being positioned remote and opposite of each other on a mounting plate of a turbine casing, with the axial travel of the signal trip element upon failure of the respective shaft interrupting a light beam produced by the optical transmitter to signal the electronic controller.

6. A shut-off system in accordance with claim 2, wherein the electric switching element comprises:
   a switch housing mounted on a mounting plate of a turbine casing;
   a switch; and
   a switching cylinder positioned in the switch housing and axially moveable therein upon contact with the axially moving signal trip element, the switching cylinder engageable with the switch, the axial movement of the switching cylinder engaging the switch to one of open and close an electric circuit to signal the electronic control.

7. A shut-off system in accordance with claim 6, and further comprising:
   a spring-loaded locating element arranged in the switch housing which is engageable with forward and rearward locating grooves positioned on a periphery of the switching cylinder to retain the switching cylinder in a respective switching state;

an insulator and an electrical conductor whose surfaces are generally flush with each other provided on the switching cylinder and movable with the switching cylinder; and the switch including two spring-loaded contact pins arranged axially one behind the other, the contact pins kept electrically isolated from one another by the insulator until axial movement of the switching cylinder engages the electrical conductor between the two contact pins to electrically connect the two contact pins to produce the signal to the electronic control.

8. A shut-off system in accordance with claim 7, wherein the respective shaft is a shaft of an engine, the system further comprising the electronic control; the at least one of the sensor and the electric switching element being connected via a connecting line to the electronic control, the electronic control connected to a power supply to a fuel shut-off valve to shut off a fuel supply to the engine upon failure of the respective shaft.

9. A shut-off device in accordance with claim 7, wherein the sensor is from the group of inductive, capacitive and ultrasonic sensors.

10. A shut-off system in accordance with claim 2, wherein the respective shaft is a shaft of an engine, the system further comprising the electronic control; the at least one of the sensor and the electric switching element being connected via a connecting line to the electronic control, the electronic control connected to a power supply to a fuel shut-off valve to shut off a fuel supply to the engine upon failure of the respective shaft.

11. A shut-off device in accordance with claim 2, wherein the sensor is from the group of inductive, capacitive and ultrasonic sensors.

12. A shut-off device in accordance with claim 1, wherein the sensor is from the group of inductive, capacitive and ultrasonic sensors.

13. A shut-off system in accordance with claim 12, and further comprising:

a mounting plate attachable to a turbine exit casing; and
a sensor pad mounted to the mounting plate, the sensor mounted to the sensor pad.

14. A shut-off system in accordance with claim 12, wherein the axial movement of the piston plate ends at a certain distance from the sensor.

15. A shut-off device in accordance with claim 1, wherein the sensor comprises an optical sensor in the form of an optical transmitter and receiver; the transmitter and receiver being positioned remote and opposite of each other on a mounting plate of a turbine casing, with the axial travel of the signal trip element upon failure of the respective shaft interrupting a light beam produced by the optical transmitter to signal the electronic controller.

16. A shut-off system in accordance with claim 1, wherein the electric switching element comprises:

a switch housing mounted on a mounting plate of a turbine casing;
a switch; and
a switching cylinder positioned in the switch housing and axially moveable therein upon contact with the axially moving signal trip element, the switching cylinder engageable with the switch, the axial movement of the switching cylinder engaging the switch to one of open and close an electric circuit to signal the electronic control.

17. A shut-off system in accordance with claim 16, and further comprising:

a spring-loaded locating element arranged in the switch housing which is engageable with forward and rearward locating grooves positioned on a periphery of the switching cylinder to retain the switching cylinder in a respective switching state;
an insulator and an electrical conductor whose surfaces are generally flush with each other provided on the switching cylinder and movable with the switching cylinder;
the switch including two spring-loaded contact pins arranged axially one behind the other, the contact pins kept electrically isolated from one another by the insulator until axial movement of the switching cylinder engages the electrical conductor between the two contact pins to electrically connect the two contact pins to produce the signal to the electronic control.

18. A shut-off system in accordance with claim 1, wherein the respective shaft is a shaft of an engine, the system further comprising the electronic control; the at least one of the sensor and the electric switching element being connected via a connecting line to the electronic control, the electronic control connected to a power supply to a fuel shut-off valve to shut off a fuel supply to the engine upon failure of the respective shaft.

19. A shut-off system in accordance with claim 1, wherein the at least one loading item is at least one of a pressure spring or a gas pressure element.

20. A shut-off system in accordance with claim 1, wherein the stop is a stop bolt.

* * * * *